Aug. 27, 1957     L. O. UPTON     2,804,378
APPARATUS FOR THE MANUFACTURE OF ARSENIC TRISULFIDE
Filed Oct. 5, 1953     3 Sheets-Sheet 1

INVENTOR
LEE O. UPTON
BY
Louis L. Gagnon
ATTORNEY

Aug. 27, 1957 L. O. UPTON 2,804,378
APPARATUS FOR THE MANUFACTURE OF ARSENIC TRISULFIDE
Filed Oct. 5, 1953 3 Sheets-Sheet 2
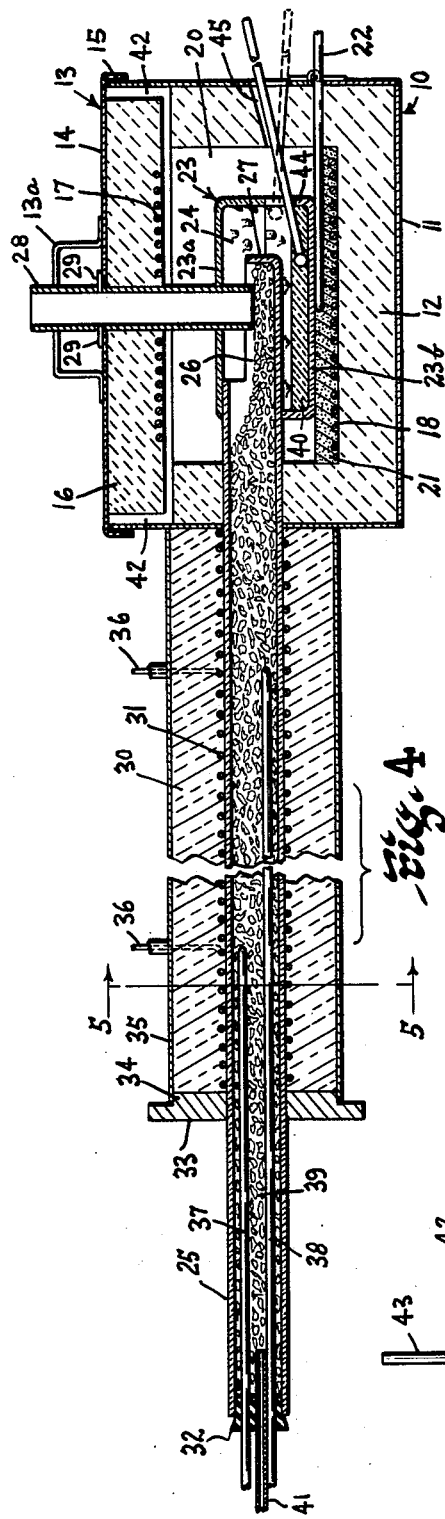
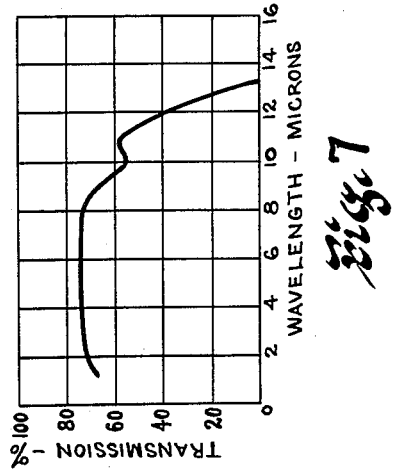
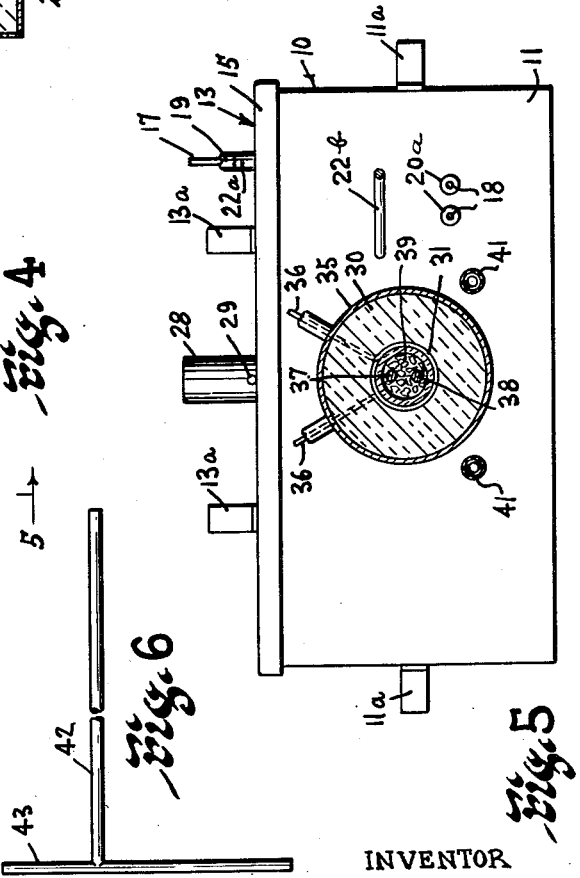
INVENTOR
LEE O. UPTON
BY
Louis L. Gagnon
ATTORNEY Aug. 27, 1957 L. O. UPTON 2,804,378
APPARATUS FOR THE MANUFACTURE OF ARSENIC TRISULFIDE
Filed Oct. 5, 1953 3 Sheets-Sheet 3
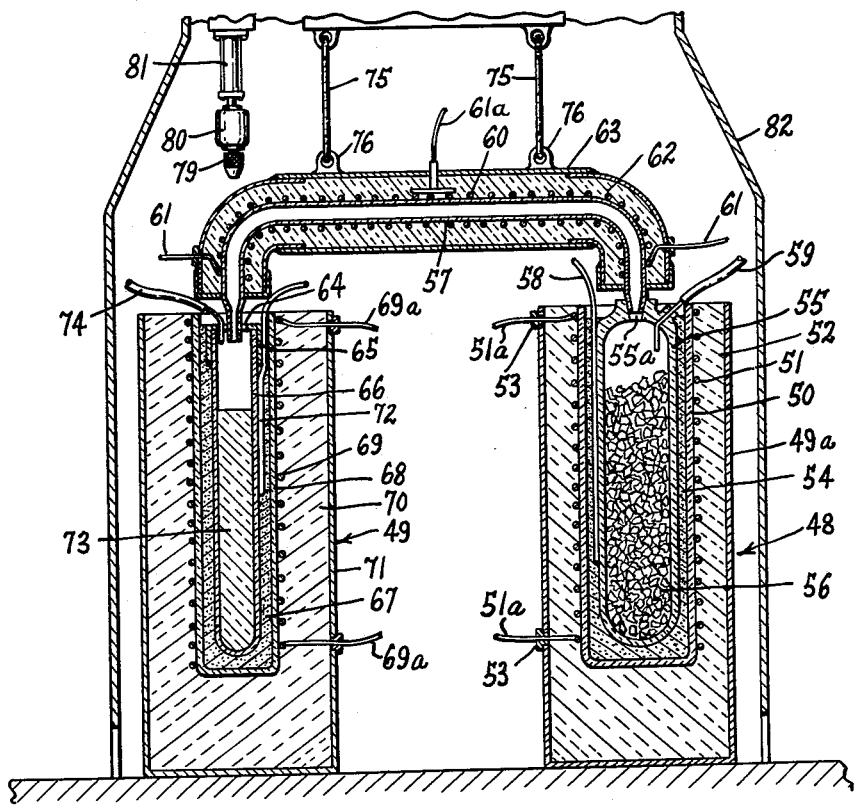
Fig. 8
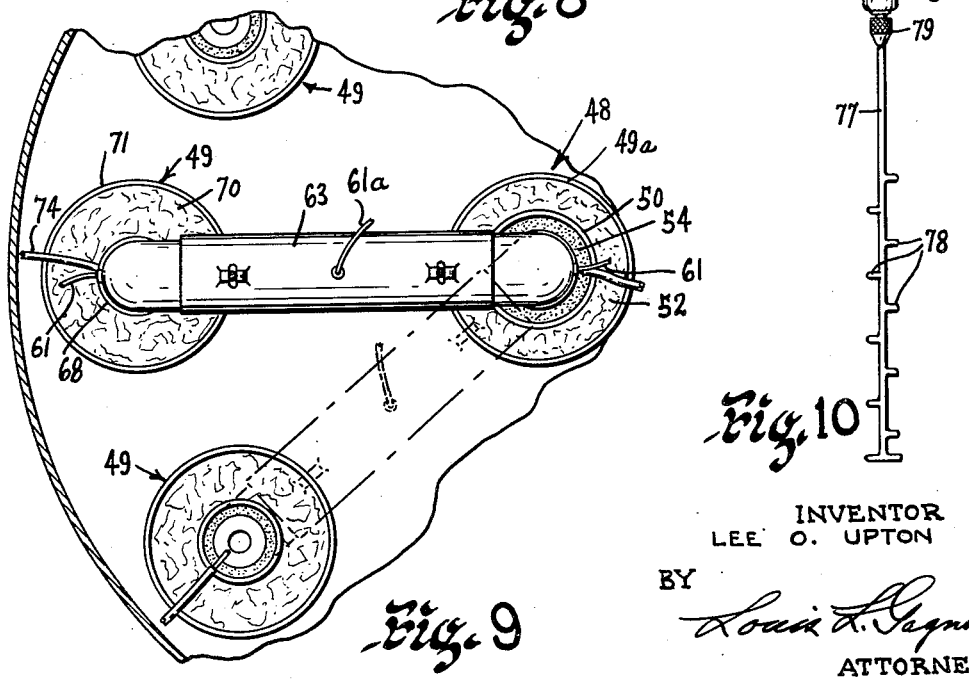
Fig. 9
Fig. 10
INVENTOR
LEE O. UPTON
BY
Louis L. Gagnon
ATTORNEY United States Patent Office 2,804,378
Patented Aug. 27, 1957

2,804,378
APPARATUS FOR THE MANUFACTURE OF ARSENIC TRISULFIDE

Lee O. Upton, Sturbridge, Mass., assignor to American Optical Company, Southbridge, Mass., a voluntary association of Massachusetts Application October 5, 1953, Serial No. 384,294

4 Claims. (Cl. 23—262)

This invention relates to improvements in means and method of manufacturing glass and has particular reference to novel apparatus and method for producing such glass as may be fabricated by vaporization of the ingredients thereof and the subsequent condensation and solidification of said vaporization product in shapes which may be easily formed into finished articles.

One of the principal objects of the invention is to provide improved means and method of producing such glass as may be fabricated by vaporization of the ingredients thereof and the subsequent condensation and solidification of said vaporization product such, for example, as arsenic sulphide glass or similar infra-red transmitting glasses, said means and method embodying apparatus comprising cooperatively functioning distilling and condensing units whereby raw arsenic and raw sulphur or arsenic sulphide cullet or the like can be converted into substantially pure glass in a continuous operation involving a controlled reacting melting, vaporizing and condensing procedure using controlled time-temperature cycles, and controlled atmospheric conditions thereby reducing considerably the overall time and labor generally involved in making such glasses.

Another object is to provide improved means and method of forming arsenic sulphide or like glass in shapes which may be easily fabricated into finished products without requiring remelting of the glass.

Another object is to provide improved means and method of making arsenic sulphide or similar glass, which means and method may be repeatedly used for producing quantities of the glass uniform as to physical, chemical and optical characteristics.

A further object is to provide a novel arrangement of furnace and condensing means embodying a distillation tube for carrying a supply of raw glass batch ingredients or cullet to be vaporized and a container or containers for receiving the distillation product of the batch or cullet, which batch or cullet is adapted to be melted and vaporized by heating coils properly associated with the distillation tube, the said arrangement further embodying heating coils adjacent the container means for controlled condensation and annealing of the distillation product, means for introducing nitrogen or other similar non-oxidizing gases and means for exhausting impure gases.

Another object is the provision of improved method and apparatus of a relatively economical nature for making infra-red transmitting glasses such as arsenic sulphide glass, arsenic trisulphide glass, arsenic selenide glass or arsenic telluride glass, or glasses composed of any desired combinations of arsenic, sulphur, selenium and tellurium.

Other objects and advantages of the invention will become apparent from the following description taken in connection with the accompanying drawings, in which:

Fig. 4 is an enlarged longitudinal vertical sectional view taken substantially through the center of the furnace shown in Fig. 1;

Fig. 5 is a transverse vertical sectional view taken substantially on line 5—5 of Fig. 4 looking in the direction of the arrows;

Fig. 6 is a plan view of a stirring rod adapted for use with the furnace shown in Fig. 1;

Fig. 7 is a transmission curve of arsenic sulphide glass made according to this invention;

Fig. 8 is a sectional front elevational view of a modification of the device embodying the invention;

Fig. 9 is a fragmentary top plan view of a suggested arrangement using the modified structure shown in Fig. 8; and Fig. 10 is an elevational view of the stirring rod used with the modified device.

Arsenic sulphide glass, which is set forth herein as one of the types of glass capable of fabrication by the improved means and method of the present invention, has been produced by various conventional means and methods known in the prior art but has generally involved a complicated and expensive process and the resultant glasses in general have not possessed desired uniform characteristics and quality. For example, a known prior art method involved placing raw glass batch material or cullet in a tube for distillation and condensation and subsequently cooling the condensation product to form a small slug. Subsequently, a number of these slugs were remelted in a second furnace in a nitrogen atmosphere and homogenized and the resultant mass was cooled. Then the cooled and hardened mass was cut into a plurality of pieces which were placed in a third furnace and heated to a temperature sufficient for "dropping" whereupon the glass assumes a sheet-like shape complementary to the bottom of the container therefor, which sheet could then be ground and polished as desired. By this involved method it was found difficult to reproduce successive identical glasses having the desired resultant optical and physical characteristics.

The present invention improves upon prior art methods of making arsenic sulphide glass or glasses having similar characteristics by the provision of an improved condensing furnace and method of making such glass whereby all of the steps of the prior art processes are combined and the resultant glass is produced after only a single melting operation. By using the presently described method and equipment, glasses made by several repetitive processes will be found to be relatively identical with respect to optical, chemical and physical properties.

Figure 3:
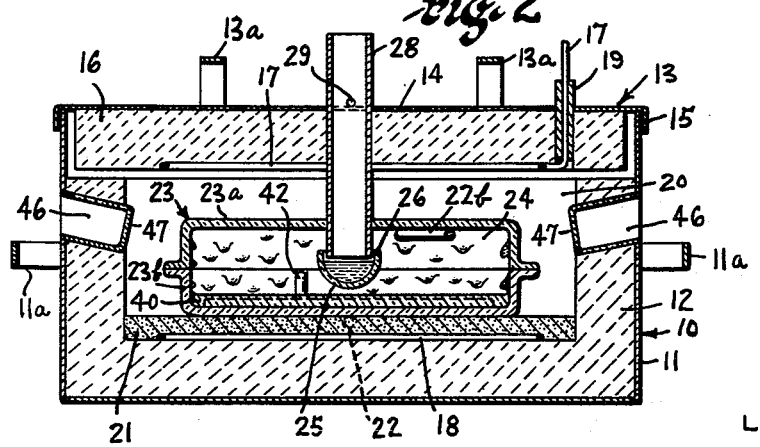
Fig. 3 is an enlarged transverse vertical sectional view taken substantially on line 3—3 of Fig. 1 looking in the direction of the arrows.

Referring more particularly to the drawings wherein like characters of reference designate like parts throughout the several views, apparatus embodying a preferred form of the invention comprises a furnace 10 having a metal box-like housing 11 lined with a relatively thick layer 12 of refractory material on the inner sides of the side walls and bottom thereof. A top or cover 13 is adapted to enclose the upper side of the furnace and comprises a metal sheet 14 which is adapted to overlie the upper edges of the metal housing 11 and is provided with a downwardly turned peripheral flange 15 which overlies the outer upper edge portion of the housing 11. The upper peripheral edge portion of the refractory liner 12 is removed as shown in Figs. 3 and 4 to provide space for a layer 16 of refractory material which is suitably secured to the inner side of the cover 13. The sides of the housing 11 have handles 11a which can be used to move the furnace when desired, and the cover 13 likewise has handles 13a by which it may be removed from the housing 11.

The furnace 10 is provided internally thereof with suitable heating coils, one set of the coils 17 being located on the inner surface of the layer 16 of refractory material carried by the cover 13 and the other set of coils 18 being located on the inner surface of the bottom of the refractory liner 12 within the furnace chamber 20. The coils 17 and 18 are connected to a source of electrical energy, the upper coils 17 having upwardly extending portions which are located within sleeves 19 carried in vertical openings in the cover 13, as shown in Fig. 3, and the lower coils 18 having portions extending through a side wall of the furnace 10 within sleeves 20a.

Located in the bottom of the inner chamber 20 of the furnace and completely covering the coils 18 is a layer 21 of refractory sand which has a thermocouple 22 therein, the thermocouple 22 being preferably disposed so that it will lie in a plane with the upper surface of the sand layer 21 as shown in Figs. 3 and 4. The thermocouple 22 is connected with an automatic pyrometer control device (not shown) which functions automatically to effect energization and deenergization of the coils 18 at any desired temperature setting. A similar thermocouple 22a is extended through the cover 13 and controls the coils 17 in a like manner. The sand 21 and thermocouple 22 provide a relatively flat surface upon which is located a container 23 formed of Pyrex or a more refractory glass such as vycor or fused silica. The container 23 is preferably formed as two similar dish-shaped members 23a and 23b, one of which is inverted and placed in edge-to-edge relation upon the other to form a chamber 24. A thermocouple 22b also lies within the upper portion 23a of the container 23 and is connected with the heating coils 17 and 18 to further control the temperature within the container 23.

One of the side walls of the furnace 10 is provided with an opening in which is extended one end of a glass tube 25 preferably formed of vycor or fused silica. The inner end of the tube 25 is extended within a similar opening formed in the container 23 and has a portion of the wall on its upper side removed as at 26 to form an outlet inwardly of the container 23. The extreme end of the tube is provided with an end wall 27 to prevent loss of materials which are located within the tube 25. Directly above the removed portion 26 of the glass tube 25 is provided a fused silica or vycor exhaust stack 28 which extends upwardly through an opening in the top portion of the container 23 and through the cover 13 of the furnace 10. Supporting pins 29 are carried by the stack 28 and extend outwardly therefrom to engage the outer surface of the cover 13 to support the stack 28 in such a manner that the lower end thereof will extend into the tube 25 a sufficient distance so that fumes may escape from the container during a glass-making operation.

The tube 25 is provided with an asbestos covering 30 therearound and is encircled by heating coils 31 which lie between the outer surface of the tube 25 and the inner surface of the asbestos covering 30. The outer end of the glass tube 25 is provided with a plug 32 formed of rubber or similar material and the adjacent end of the asbestos covering 30 is also sealed by a disc-like member 33 which has a shouldered portion 34 which fits intimately within the adjacent end of a sheet-metal tube or sleeve 35 which protects the asbestos covering 30. The coils 31 are connected to a suitable source of electrical energy as by connecting portions 36 which extend through the asbestos covering 30 and sleeve 35.

Within the tube 25 are extended a pair of thermocouples 37 and 38, the thermocouples extending through the plug 32 and being provided to control the coils 31 to maintain the desired temperature within the interior of the tube 25.

Figure 1:
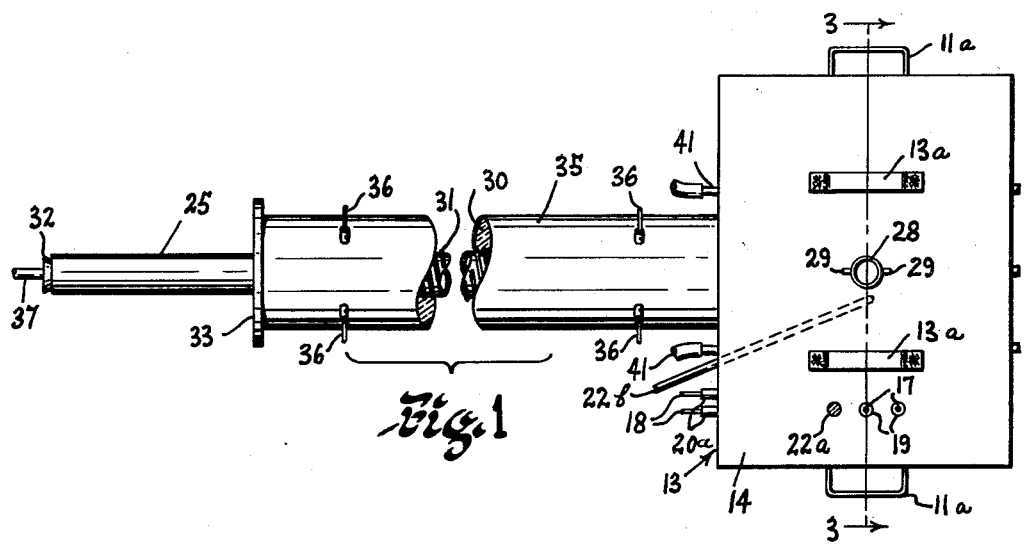
Fig. 1 is a plan view of a furnace embodying the present invention.
Figure 2:
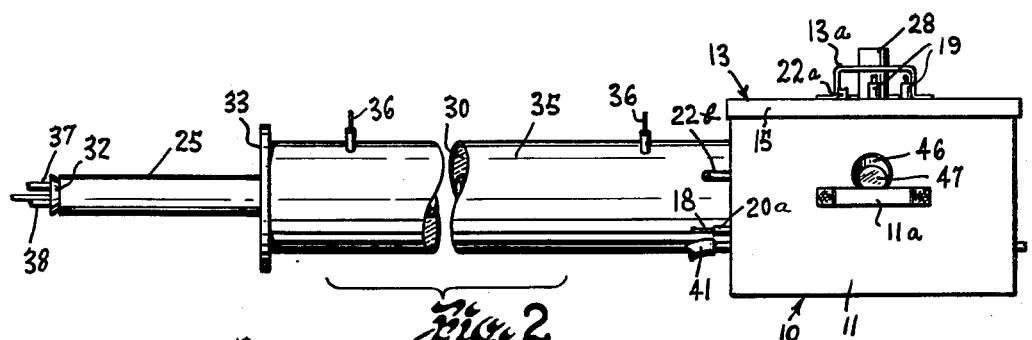
Fig. 2 is a side elevational view of the furnace shown in Fig. 1.

In making arsenic sulphide glass, for example, with a furnace of this type, the tube 25 is initially filled with raw arsenic and sulphur batch or with a cullet 39 comprised of crushed raw arsenic sulphide glass synthesized by previously melting the rough stoichiometric proportions of arsenic metal and sulphur. The heating coils 31 then function to heat the cullet or raw batch to a temperature of from approximately 700° C. to 800° C. to cause the raw material to melt and volatilize. Simultaneously nitrogen, helium or like non-oxidizing gas is introduced into the interior of the tube 25 through an inlet tube 41 which extends through the plug 32. The volatilized glass will pass in the form of a vapor out through the open portion 26 of the end of the tube 25 into the container 23 which is heated to only about 600° C. The vapor will thus condense and will form droplets on the inner walls of the container 23, which droplets will flow under the action of gravity into the bottom of the container where it will form a liquid pool of glass. The coils 17 and 18 within the furnace 10 function with coils 31 to maintain the desired controlled heat throughout the apparatus. The interior of the furnace is also filled with the non-oxidizing gas to prevent the entrance of oxygen which might leak into the chamber 20 and cause oxidation of the vapor. The means for introducing the gas into the chamber 20 comprises inlet tubes 41 (Figs. 1, 2 and 5). The gas is introduced into the chamber 20 under pressure and thus will bleed outwardly around the furnace cover 14 through the spaces 42 provided therefor between the layers 16 and 12 of refractory material and thereby prevent entrance of oxygen. Exhaust of undesired volatile gases which form impurities, as well as of the nitrogen, is accomplished through the stack 28. Thus only substantially pure arsenic sulphide vapors will condense to form the glass as described. The function of the gas introduced is extremely important since it is necessary that means be provided for preventing possible contamination by atmospheric oxygen.

A number of windows are placed in the walls of the furnace for permitting observation of the container 23 and liquid glass 40 therein. The windows are shaped as cups 46 formed of Pyrex having their bottom portions 47 adjacent the inner surfaces of the furnace walls. Thus since the effective window portions 47 or bottoms of the cups 46 are inside the furnace where extreme heat exists they will stay relatively clean and transparent.

The end point of volatilization or distillation may be controlled by observing the condensed material through the windows 47. When the windows become badly fogged or when the temperature, as indicated by the pyrometer controllers, has reached 700° C., the operator has indication that the end point is reached.

After the completion of the distillation and condensation of the arsenic sulphide vapors, the chamber temperature is dropped to about 500° C., during which time stirring is done and homogenization of the glass is accomplished. The stirring is accomplished by means of a substantially T-shaped glass stirring rod 42 (Fig. 6) which is adapted to be located with its cross member 43 positioned within the chamber 24 of the container 25 and with its long arm extending outwardly through an opening 44 in the container 23 and through a funnel-like opening 45 in the furnace 10. Thus an operator can grasp the stirring rod 42 and oscillate the cross member 43 thereof in the pool 40 of glass in the container 23. The cross member 43 can be raised and retained out of the pool 40 when desired by resting the long arm of the rod 42 upon the bottom of the opening 45 as indicated by dotted lines in Fig. 4.

As homogenization is accomplished the temperature is then reduced to 200° C. and held for approximately 4 hours for the purpose of annealing the glass, after which the heating coils are completely turned off and the furnace is allowed to slowly assume room temperature. At the time homogenization starts, the supply of nitrogen or other non-oxidizing gas entering the tube 39 is cut off and is then injected through the stack 28. Cool gas entering the container 23 in this way prevents further volatilization of the condensed glass in the container 23 by lowering the vapor pressure of the surface of the melt.

The resultant arsenic sulphide glass can subsequently be easily removed from the container 23 in sheet-like form and can be then made into the desired products. The sheet, formed in the manner described above, provides a glass having optical properties especially suitable for certain desired purposes such as for producing lenses or the like.

It is particularly pointed out that the raw material or cullet 39 which is placed in the tube 25 may contain foreign matter detrimental to the resultant glass to be formed. By heating the raw material or cullet to a temperature of at least 700° C. as described, the foreign matter as well as the cullet will melt and vaporize. Some of the foreign material may be more volatile than the arsenic sulphide and thus will pass out through the stack 28 as gas. Portions of the foreign material which are more refractory than the arsenic sulphide will remain as residue within the tube 35. The condensing temperature of 600° C. is such that the volatilized contaminants will either exhaust as gas or remain as residue in the tube 35, the particular temperature of 600° C. bringing about the condensation of only the arsenic sulphide. The residual foreign matter can be easily subsequently scraped out of the tube 35.

At least 700° C. has been used as the melting temperature because this is approximately the boiling point of arsenic sulphide. However, lower temperatures may be used but the rate of volatilization will be slowed accordingly and the overall success of the operation is not certain.

Although, as has been stated above, arsenic sulphide glass and similar types of glass have been manufactured by prior art methods, a great difficulty has arisen due to the fact that the resultant glass is difficult to manufacture unless it is done under a nitrogen or like non-oxidizing atmosphere. However, arsenic sulphide glasses, for example, having high infra-red transmission can be repeatedly produced by the presently described means and method and will possess a transmission curve substantially as shown in Fig. 7.

In Figs. 8 and 9 there is illustrated a modified glass-making furnace embodying the present invention. It has been found that the time involved in condensing, homogenizing and solidifying the glass is substantially greater than the time required for the distillation cycle. Therefore, an arrangement embodying a plurality of condensing units arranged for use with a single distillation unit has been found practical. In such an arrangement the distillation and condensing units are entirely separate from one another with means being provided for connecting the single distillation unit successively with the plurality of condensing units whereby the vapor formed in the distillation unit will pass through the connecting means into the respective condensing units for condensation and solidification therein accordance with the method described hereinbefore.

The distillation unit is indicated in Figs. 8 and 9 generally by numeral 48 and the condensing units are indicated generally by numeral 49. The distillation unit comprises an upright tubular metal housing 49a which has suspended therein a hollow cylindrical muffle 50 formed of fused silica or the like and having heating coils 51 wound therearound. Enclosing the sides and bottom of the muffle 50 is a supply of granular refractory insulating material 52 such as alumina which will prevent any substantial amount of heat emitted by the coils 51 from being transmitted to the metal housing 49a. The heating coils are connected to a suitable source of electrical energy as by leads 51a which extend therefrom through the encircling refractory material 52 and through insulating members 53 located within openings formed therefor in the metal housing 49. Supported within the muffle 50 by means of alumina 54 or other similar granular refractory material is a hollow distillation tube 55 which is preferably formed of fused silica or the like and which contains a supply of raw material or cullet 56 which is to be converted into the resultant glass. The upper end of the distillation tube 55 is provided with a neck having an opening 55a therein which is adapted to receive one end of a pipe 57 which extends outwardly therefrom and which has its opposed end connected with the condensing unit 49.

Thus, when heat from the coils 51 is applied to the raw material or cullet 56, the raw material or cullet will vaporize and the vapor will pass outwardly of the distillation tube 55 through the pipe 57 to the condensing unit 49. A thermocouple 58 is inserted adjacent the outer wall of the distillation tube 55 to provide proper temperature control for the vaporizing process. Nitrogen or other non-oxidizing atmospheres may be inserted into the interior of the distillation tube 55 by means of a hose 59 which is shaped to extend through the wall of the tube 55.

The connecting pipe 57 is also provided with heating coils 60 therearound, which are connected by leads 61 to a source of electrical current, and is also enclosed by refractory insulating material 62 such as asbestos or the like which is confined by metal sleeves 63. A thermocouple temperature control 61a is also extended through the sleeve 63 and insulation 62 and disposed adjacent the coils 60 to maintain heat in the pipe 57 of high enough temperature to prevent condensation of the vapor therein. The end of the pipe 57 which is connected to the condensing unit 49 is shaped for insertion within an opening 64 in a cap 65 which is maintained over the upper end of a hollow condensing tube 66, which tube 66 is supported as by alumina or the like 67 within a muffle 68 formed preferably of fused silica, the muffle 68 being closely encircled by heating coils 69 which are connected by leads 69a to a source of electrical energy. The muffle 68 is also embedded in a supply of alumina or other similar refractory insulating material 70 which is confined within a tubular metal housing 71 similar to the housing 49 of the distillation unit. Temperature control of the interior of the condensing tube 66 is provided by means such as a thermocouple 72 which is inserted within the muffle 68 adjacent the outer wall of the tube 66. Thus, vapor passing from the distillation tube 55 through the pipe 57 will be collected within the chamber of the condensing tube 66 and, due to the temperature therein, will form a supply 73 of liquid glass within the condensing tube 66.

A non-oxidizing atmosphere is introduced into the interior of the condensing tube 66 by means of a hose 74 which is adapted to extend through the cap 65 which encloses the open upper end of the condensing tube 66. Impurities are allowed to escape through the opening 64 which is substantially larger than the adjacent end of the pipe 57.

It is apparent that with a modified structure of this type, the method described in connection with the embodiment of the invention shown in Figs. 1 through 5 will apply. Since the liquid pool 73 must be homogenized and solidified it is necessary to remove the pipe 57 from the opening 64. To accomplish this suitable hoistening cables 75 are attached to lugs 76 formed on the sleeve 63, which cables 75 can be operated by suitable mechanism, not shown, to lift the pipe 57 out of connected relation with the distillation and condensing units 48 and 49. Such hoistening mechanism can also be used to transfer the outlet end of the pipe 57 to the next in the succession of condensing units 49 whereupon vapor formed by the same or another supply of raw material or cullet 56 in the distillation chamber 55 will be enabled to pass through the pipe 57 to the second condensing unit 49, as shown by dotted lines in Fig. 9, while the relatively slow homogenizing and solidification of the liquid pool 73 in the first condensing unit is taking place.

To properly homogenize the liquid pool 73, there is provided an elongated stirring rod 77 (Fig. 10) which carries thereon a plurality of radially extending nodules or fins 78. The stirring rod 77 is adapted to be inserted into the interior of the condensing chamber 66 and to be connected at its upper end by means of a chuck 79 to an electric motor 80 which functions to rotate the stirring rod 77 in the liquid pool 73. The electric motor 80 is in turn connected to an air motor 81 which functions to oscillate the electric motor 80 and stirring rod 77 up and down whereupon complete homogenization of the liquid pool 73 will be effected. As with the previously described method, nitrogen or other non-oxidizing gas is fed into the condensing units 49 during homogenization.

It is apparent that the stirring device can be maintained above the condensing units 49 for movement from one to another thereof or that a separate stirring device may be provided for each individual condensing unit 49.

It may also be advisable to provide means for preventing contamination of the air outside the furnace area by any substantial amount of exhaust vapors which may be detrimental to the health of the operators of the device. Therefore, a furnace embodying the present invention may be enclosed within a metal chamber 82, as shown in Fig. 8, which chamber can be easily and efficiently evacuated by any conventional means.

Although the use of thermocouples for controlling the heat in various parts of the apparatus has been specifically described it is to be understood that other arrangements of such control devices may be used if desired.

Although specific means and method have been described for making arsenic sulphide glass, arsenic trisulphide glass, arsenic selenide glass and arsenic telluride glasses, it is to be understood that other glasses can also be made with the presently described furnace by controlling the melting and condensing temperatures during the process.

From the foregoing description it will be apparent that improved means and method of making glass have been provided.

While the novel features of the invention have been shown and described and are pointed out in the annexed claims, it is to be understood that various omissions, substitutions and changes in the construction and arrangement of parts and details of methods shown and described may be made by those skilled in the art without departing from the spirit of the invention. Therefore it is to be understood that all matter shown or described is to be interpreted as illustrative and not in a limiting sense.

I claim:

1. Apparatus for making glass comprising a distilling and condensing furnace embodying a distillation chamber having an entrance in the top portion thereof, a plurality of condensing chambers each also having an entrance in the top portion thereof, and conduit means adapted to selectively connect said distillation chamber with said condensing chambers, said distillation chamber being adapted to carry a supply of the material to be converted into the desired glass and having heating means for raising the temperature therewithin sufficiently to vaporize said material whereby said material in vaporized form will flow through the conduit to a selected condensing chamber, heating means for each of said condensing chambers adapted to maintain a controlled temperature therewithin such that the glass forming portion of said vaporized material from said distillation chamber will condense and form a liquid pool in the respective condensing chamber, means connected with the interiors of said distillation and condensing chambers for introducing a non-oxidizing atmosphere therein, and exhaust means for said condensing chamber through which the non-condensing undesired volatile gases may escape therefrom.

2. Apparatus for use in the manufacture of glasses such as arsenic trisulphide and the like comprising an insulated distilling furnace having a refractory lined chamber for receiving a charge of raw glass forming material to be vaporized and having an outlet in the top thereof, means for heating the chamber to a temperature where the charge of raw glass forming material will vaporize, a plurality of insulated condensing chambers, conduit means adapted to selectively connect the outlet in the top of said refractory lined chamber with said respective condensing chambers, a closed-bottom container in each of said condensing chambers to receive the condensation product of said vapors passing through said outlet, an exit connecting with said containers in the condensing chambers through which undesired volatile gases may escape, means for heating the condensing chamber to a temperature at which the vapors of glass will condense while the uncondensed undesired volatile gases are allowed to escape through said exit, and means for directing a non-oxidizing gas into said refractory lined chamber and condensing chamber during the heating thereof.

3. Apparatus for use in the manufacture of arsenic trisulphide glasses comprising an insulated distilling furnace having a refractory lined chamber for receiving a charge of raw arsenic and raw sulphur, or arsenic sulphide cullet material to be vaporized, means for heating the chamber to a temperature between 700° and 800° C. where the charge of raw material will vaporize, a plurality of insulated condensing chambers, conduit means adapted to selectively connect the top of said distilling furnace and the top of one of said condensing chambers, said condensing chambers embodying a closed-bottom container of refractory glass to receive the condensation product of said vapors, an exit connecting with said condensing chambers through which the uncondensed gaseous products forming impurities in the glass may escape, means for heating the condensing chambers to a temperature at which the vapors of glass will condense while the undesired gaseous products are allowed to escape, means for directing a non-oxidizing gas into the chambers of said distilling furnace and into said condensing chambers during said heating thereof, and stirring means for homogenizing the condensed liquid product in the containers.

4. Apparatus for making glass comprising a distillation and condensing furnace embodying a distillation chamber and a plurality of condensing chambers, said distillation chamber being adapted to carry a supply of the material to be converted into the desired glass and having heating means for raising the temperature therewithin sufficiently to vaporize said material, means for selectively connecting the condensing chambers in communicating relation with the said distillation chamber in such manner that said vaporized material from said distillation chamber will pass through said connecting means to the selected condensing chamber, heating means for each of said condensing chambers adapted to maintain a temperature therewithin of a sufficiency to cause the vapor from said distillation chamber to condense in said condensing chamber and form a liquid pool therein, means connected with the interiors of said distillation and condensing chambers for introducing a non-oxidizing atmosphere therein and exhaust means for said condensing chambers through which the non-condensing undesired volatile gases may escape therefrom.

References Cited in the file of this patent

UNITED STATES PATENTS

| | | |
|---|---|---|
| 1,665,406 | Danckwardt | Apr. 10, 1928 |
| 1,898,039 | Eckert | Feb. 21, 1933 |
| 1,917,725 | Lenander | July 11, 1933 |
| 2,255,549 | Kruh | Sept. 9, 1941 |
| 2,331,524 | Wade | Oct. 12, 1943 |
| 2,531,143 | Malm et al. | Nov. 21, 1950 |

FOREIGN PATENTS

| | | |
|---|---|---|
| 358,863 | Great Britain | Oct. 15, 1931 |

OTHER REFERENCES

Handbook of Glass Manufacture, Tooley Pub., by Ogden Pub. Co., New York, 1953, page 5.